United States Patent
Simmons et al.

(10) Patent No.: US 10,327,387 B2
(45) Date of Patent: Jun. 25, 2019

(54) SPREAD ROLL CAP SYSTEM

(71) Applicant: CNH Industrial America, LLC, New Holland, PA (US)

(72) Inventors: Scott C. Simmons, Lititz, PA (US); Larry L. Hoover, Landisville, PA (US); Charles B. Peterson, West Grove, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/610,821

(22) Filed: Jun. 1, 2017

(65) Prior Publication Data

US 2018/0064031 A1 Mar. 8, 2018

(30) Foreign Application Priority Data

Sep. 5, 2016 (EP) .................................... 16187233

(51) Int. Cl.
*A01F 15/07* (2006.01)
*A01F 15/18* (2006.01)

(52) U.S. Cl.
CPC .......... *A01F 15/0715* (2013.01); *A01F 15/18* (2013.01); *A01F 2015/0725* (2013.01); *A01F 2015/186* (2013.01)

(58) Field of Classification Search
CPC .... A01D 69/00; A01D 89/002; A01D 89/007; A01D 89/008; A01F 15/0825; A01F 15/0715; A01F 15/18; A01F 15/106; A01F 15/12; A01F 15/14; A01F 15/085; B65B 11/04; B65B 11/56; B65B 27/125; B65G 33/00; B65G 53/48

USPC ......... 53/118, 211, 389.1, 556, 587; 56/11.2, 56/341, 344, 364; 100/15, 88, 89; 414/303, 412, 607

See application file for complete search history.

(56) References Cited

U.S. PATENT DOCUMENTS

| | | | |
|---|---|---|---|
| 5,005,747 A * | 4/1991 | Anstey | A01F 15/0715 226/190 |
| 6,006,504 A * | 12/1999 | Myers | A01F 15/0715 53/556 |
| 6,295,797 B1 | 10/2001 | Naaktgeboren et al. | |
| 6,550,218 B2 * | 4/2003 | McClure | A01F 15/0715 53/118 |
| 6,594,975 B2 * | 7/2003 | Anstey | A01F 15/0715 53/118 |
| 6,606,843 B1 | 8/2003 | Anstey et al. | |
| 6,622,463 B1 * | 9/2003 | Anstey | A01F 15/12 53/118 |
| 6,644,006 B1 | 11/2003 | Merritt et al. | |
| 6,688,092 B2 | 2/2004 | Anstey et al. | |
| 6,877,304 B1 | 4/2005 | Smith et al. | |

(Continued)

OTHER PUBLICATIONS

European Search Report for European Application No. 16187233.8 dated Jan. 25, 2018 (8 pages).

*Primary Examiner* — Robert E Pezzuto
(74) *Attorney, Agent, or Firm* — Patrick M. Sheldrake; Peter K. Zacharias (57) ABSTRACT

An end cap for a spreader roll has a base portion and a pin portion, wherein the pin portion inserts into a bearing mechanism to allow the material spread roll to rotate. The base portion includes a mechanism to prevent wrapping material stretched by the material spread roll from reaching the bearing mechanism.

21 Claims, 6 Drawing Sheets

(56) References Cited

U.S. PATENT DOCUMENTS

| | | | |
|---|---|---|---|
| 7,464,523 B2* | 12/2008 | Vande Ryse | A01F 15/0715 53/201 |
| 8,429,881 B2* | 4/2013 | James | A01F 15/0715 53/389.4 |
| 10,028,438 B2* | 7/2018 | Boone | A01D 89/002 |
| 2001/0001779 A1 | 5/2001 | Viaud | |
| 2004/0250704 A1 | 12/2004 | Viaud | |
| 2008/0120957 A1 | 5/2008 | Delphigue | |
| 2011/0067374 A1 | 3/2011 | James et al. | |
| 2013/0305683 A1 | 11/2013 | Ziembicki | |

* cited by examiner

SPREAD ROLL CAP SYSTEM

CROSS-RELATED APPLICATIONS

This application claims priority to EP Patent Application Serial No. 161872338, filed Sep. 5, 2016, the contents of which are hereby incorporated by reference in its entirety into this application.

FIELD

The present disclosure generally relates to an end cap for a roller, and specifically to an end cap for a material spread roll in a harvester.

BACKGROUND

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside, the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Wrapping material is fed into the baler off a wrapping material roll and into a wrapping mechanism, conventionally located in the front of the baler. One of the processes managed by the wrapping mechanism is making sure the wrapping material is spread out before being placed on the bale. This ensures that the wrapping material is not bunched or crumpled, but is instead both taught and wide enough to cover the entire width of the bale. Typically, a spread roll is used for this task. Conventional spread rolls comprises a journaled roller placed between two sidewalls of a harvester. Wrapped around the spread roll is one or more coils that travel in a screw-like fashion towards at least one of the sidewalls. As the spread roll rotates, wrapping material in contact with a coil is stretched towards the sidewall, keeping the wrapping material taught as it proceeds towards wrapping the bale.

A common problem with such a system is that wrapping material can be stretched too far and come in contact with the journaled bearing on either end of the spread roll. Wrapping material can be caught by the rotation of the bearings and become damaged, leaving pieces of debris material in or around the bearings. Over time, such debris can build up, causing increased maintenance issues with the spread roll in general and the bearings in particular. There is a need for a prevention mechanism, such as a cap, that can prevent wrapping material from contacting the bearings in a spread roll.

SUMMARY

The present disclosure relates to a system comprising: a pair of oppositely facing sidewalls configured for attachment to a frame or a subframe of a harvester; at least one material spread roll, positioned transversely between the pair of sidewalls and about a rotational axis, the at least one material spread roll comprising: (i) a roll tube comprising an exterior surface, a longitudinal length and at least one face on at least one end of the longitudinal length, said face defining a width of the roll tube; (ii) at least one cap positioned over or proximate to the at least one face of the roll tube, said cap comprising a base portion and a pin portion; and (iii) at least one bearing mechanism comprising a bearing and a flange; wherein the base portion of the at least one cap comprises oppositely positioned inner and outer surfaces laterally positioned relative to the roll tube and oppositely a contiguous ring surface axially positioned relative to the roll tube; wherein the pin portion of the at least one cap comprises an outer surface and is longitudinally positioned around the rotational axis; wherein the inner surface of the base portion of the at least one cap covers, is adjacent to, or is proximate to the at least one face of the roll tube; and wherein the bearing is positioned around the pin portion of the at least one cap and the flange is mechanically linked to at least one sidewall.

In some embodiments, the base portion comprises a wall on the inner surface of the cap, circumferentially positioned along the exterior surface of the roll tube, with a height equal to or approximately equal to the difference between the width of the cap and the width of the roll tube; and wherein the wall is capable of preventing wrapping material from contacting the bearing mechanism.

In some embodiments, the base portion comprises a ring groove circumferentially positioned along the ring surface of the cap, with a depth less that the difference between the width of the cap and the width of the roll tube; and wherein the ring groove is capable of preventing wrapping material from contacting the bearing mechanism.

In some embodiments, the base portion comprises a bearing groove circumferentially positioned along the outer surface of the cap at or approximately at the junction of the base portion and the pin portion, with a width larger than the bearing such that the at least one bearing mechanism is capable of being at least partially positioned into the bearing groove; and wherein the bearing groove is capable of preventing wrapping material from contacting the bearing mechanism.

In some embodiments, the base portion comprises: a wall on the inner surface of the cap, circumferentially positioned along the exterior surface of the roll tube, with a height equal to or approximately equal to the difference between the width of the cap and the width of the roll tube; a ring groove circumferentially positioned along the ring surface of the cap, with a depth less that the difference between the width of the cap and the width of the roll tube; and a bearing groove circumferentially positioned along the outer surface of the cap at or approximately at the junction of the base portion and the pin portion, with a width larger than the bearing such that the at least one bearing mechanism is capable of being at least partially positioned into the bearing groove; wherein the wall, the ring groove, and the bearing groove, alone or in combination, are capable of preventing wrapping material from contacting the bearing mechanism.

In some embodiments, the material spread roll is cylindrical. In some embodiments, the roll tube is cylindrical. In some embodiments, the coil is positioned around the outside surface of the longitudinal length of the roll tube. In some embodiments, there is a groove or cavity in the ring surface of the base portion. In some embodiments, the outer surface of the pin portion and the outer surface of the base portion are contiguous. In some embodiments, the outer surface of the pin portion is orthogonal to the outer surface of the base portion. In some embodiments, the at least one material spread roll comprises two caps, with each of the inner surfaces of the two caps covering the ends of the roll tube. In some embodiments, the system further comprises a wrapping material positioned around the material spread roll.

In some embodiments, in a first operation mode, the at least one coil spreads the wrapping material across the longitudinal length of the roll tube as the cylinder rotates about the rotational axis. In some embodiments, in the first operational mode, the at least one cap is capable of preventing the wrapping material from contacting the bearing mechanism. In some embodiments, in the first operational mode, the at least one cap is capable of preventing the wrapping material from contacting the pin portion of the at least one cap.

The present disclosure also relates to a harvester comprising: a pair of oppositely facing sidewalls attached to a frame or a subframe of the harvester; at least one material spread roll, positioned transversely between the pair of sidewalls and about a rotational axis, the at least one material spread roll comprising: (i) a roll tube comprising an exterior surface, a longitudinal length and at least one face on at least one end of the longitudinal length, said face defining a width of the roll tube; (ii) at least one cap positioned over or proximate to the at least one face of the roll tube, said cap comprising a base portion and a pin portion; and (iii) at least one bearing mechanism comprising a bearing and a flange; wherein the base portion of the at least one cap comprises oppositely positioned inner and outer surfaces laterally positioned relative to the roll tube and oppositely a contiguous ring surface axially positioned relative to the roll tube; wherein the pin portion of the at least one cap comprises an outer surface and is longitudinally positioned around the rotational axis; wherein the inner surface of the base portion of the at least one cap covers, is adjacent to, or is proximate to the at least one face of the roll tube; and wherein the bearing is positioned around the pin portion of the at least one cap and the flange is mechanically linked to at least one sidewall.

In some embodiments, the base portion comprises a wall on the inner surface of the cap, circumferentially positioned along the exterior surface of the roll tube, with a height equal to or approximately equal to the difference between the width of the cap and the width of the roll tube; and wherein the wall is capable of preventing wrapping material from contacting the bearing mechanism.

In some embodiments, the base portion comprises a ring groove circumferentially positioned along the ring surface of the cap, with a depth less that the difference between the width of the cap and the width of the roll tube; and wherein the ring groove is capable of preventing wrapping material from contacting the bearing mechanism.

In some embodiments, the base portion comprises a bearing groove circumferentially positioned along the outer surface of the cap at or approximately at the junction of the base portion and the pin portion, with a width larger than the bearing such that the at least one bearing mechanism is capable of being at least partially positioned into the bearing groove; and wherein the bearing groove is capable of preventing wrapping material from contacting the bearing mechanism.

In some embodiments, the base portion comprises: a wall on the inner surface of the cap, circumferentially positioned along the exterior surface of the roll tube, with a height equal to or approximately equal to the difference between the width of the cap and the width of the roll tube; a ring groove circumferentially positioned along the ring surface of the cap, with a depth less that the difference between the width of the cap and the width of the roll tube; and a bearing groove circumferentially positioned along the outer surface of the cap at or approximately at the junction of the base portion and the pin portion, with a width larger than the bearing such that the at least one bearing mechanism is capable of being at least partially positioned into the bearing groove; wherein the wall, the ring groove, and the bearing groove, alone or in combination, are capable of preventing wrapping material from contacting the bearing mechanism.

In some embodiments, the material spread roll is cylindrical. In some embodiments, the roll tube is cylindrical. In some embodiments, the coil is positioned around the outside surface of the longitudinal length of the roll tube. In some embodiments, there is a groove or cavity in the ring surface of the base portion. In some embodiments, the outer surface of the pin portion and the outer surface of the base portion are contiguous. In some embodiments, the outer surface of the pin portion is orthogonal to the outer surface of the base portion. In some embodiments, the at least one material spread roll comprises two caps, with each of the inner surfaces of the two caps covering the ends of the roll tube. In some embodiments, the system further comprises a wrapping material positioned around the material spread roll.

In some embodiments, in a first operation mode, the at least one coil spreads the wrapping material across the longitudinal length of the roll tube as the cylinder rotates about the rotational axis. In some embodiments, in the first operational mode, the at least one cap is capable of preventing the wrapping material from contacting the bearing mechanism. In some embodiments, in the first operational mode, the at least one cap is capable of preventing the wrapping material from contacting the pin portion of the at least one cap.

The present disclosure also relates to a method of wrapping a bale, comprising: (a) loading a roll of wrapping material onto a material support cylinder; (b) dispensing wrapping material from the roll of wrapping material onto a material spread cylinder; (c) spreading the wrapping material across the length of the material spread cylinder by the rotation of the material spread cylinder around an axis, such that the wrapping material is capable of completely covering the width of a bale; (d) simultaneous with (c), preventing the wrapping material from reaching one or more bearings positioned at the ends of the material spread cylinder by one or more caps positioned at the ends of the material spread cylinder; (e) dispensing the spread wrapping material from the material spread cylinder to a bale in a bale chamber, such that the spread wrapping material is capable of wrapping the bale.

In some embodiments, in step (d), the wrapping material is prevented from reaching the one or more bearings by a base portion of the one or more caps, the base portion comprising: a wall on the inner surface of the cap, circumferentially positioned along the exterior surface of the roll tube, with a height equal to or approximately equal to the difference between the width of the cap and the width of the roll tube; a ring groove circumferentially positioned along the ring surface of the cap, with a depth less that the difference between the width of the cap and the width of the roll tube; and a bearing groove circumferentially positioned along the outer surface of the cap at or approximately at the junction of the base portion and the pin portion, with a width larger than the bearing such that the at least one bearing mechanism is capable of being at least partially positioned into the bearing groove; wherein the wall, the ring groove, and the bearing groove, alone or in combination, are capable of preventing wrapping material from contacting the bearing mechanism.

BRIEF DESCRIPTION OF THE DRAWINGS

FIGS. 6A and 6B depicts a three dimensional view of a spread roll with a cap and bearing system that prevents wrapping material from contacting the bearings of said roll inserted into a wrapping system of a harvester.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The term "harvester" as used herein is defined as a machine designed to consolidate and package material so as to facilitate the storage and handling of the material for later use. In some embodiments, the harvester is used to harvest agricultural material. In some embodiments, the harvester is known as an agricultural baler, a waste baler, or a combine.

The term "material" as used herein is defined as a numerous individual items that are harvested or collected by the harvester. In some embodiments, the material is agricultural crop, such as hay or cotton. In some embodiments, the material is biomass.

The term "harvesting assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. U.S. 20130305683 A1 that illustrates such mechanisms, the disclosures of which are incorporated herein by reference in their entirety.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "wrapping mechanism" as used herein is defined as a mechanical device or assembly that uses wrapping material to wrap a formed bale. In some embodiments, the net wrapping mechanism comprises at least one material support cylinder, and at least one material spread roll. In some embodiments, the wrapping mechanism is positioned within the interior of a harvester.

The term "roll tube" refers to a longitudinal member comprising a curved or partially curved surface defining a length of the member and at least one face on at least one end of the length that defines a width of the member. In some embodiments, the longitudinal member is configured for attached to a wrapping mechanism and/or is positioned traversely between sidewalls of a harvester such that the length of the longitudinal member is capable of rotating around at least one axis. In some embodiments, the axis is positioned at the center of the width of the at least one end. In some embodiments, the longitudinal member is cylindrical or substantially cylindrical with a circular or semicircular face at the least one end with a diameter that defines the width of the member and is positioned around the axis. In some embodiments, the longitudinal member comprises two opposed faces.

The term "wrapping material" as used herein is defined as a net, mesh, twine, plastic film, or other material that is used for the wrapping of a bale in order to maintain the shape and density of said bale and optionally protect it from weather or other external conditions.

The term "material support cylinder" as used herein is defined as a rod or tube configured for supporting a roll of wrapping material. In some embodiments, the roll of wrapping material is capable of rotating about the material support cylinder on the material support cylinder axis.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine.

The present disclosure relates to a system for a material spread roll in a harvester that prevents wrapping material stretched by the material spread roll during the operation of the harvester from reaching the bearings of the material spread roll if the wrapping material is stretched too far. The system comprises a cap and bearing mechanism that has multiple, independent ways of preventing wrapping material from reaching the bearing. In some embodiments, the system exists on both ends of the material spread roll.

In some embodiments, the cap comprises a base portion and a pin portion. The base portion covers the end of the material spread roll, and the pin portion operably connects with the bearing mechanism. The base section is wider than the face of the material spread roll and provides multiple features to prevent wrapping material from moving past the base portion and reaching the pin portion and bearing mechanism. In some embodiments, the base section comprises an inner surface that is operably connected with a roll tube, an outer surface that faces the sidewall of the wrapping mechanism and is congruent with the pin portion of the cap, and a ring surface that connects the inner and outer surfaces. In some embodiments, the base section further comprises a wall on the inner surface of the cap, circumferentially positioned along the exterior surface of the roll tube, with a height equal to or approximately equal to the difference between the width of the cap and the width of the roll tube. In some embodiments, the base section further comprises a ring groove circumferentially positioned along the ring surface of the cap, with a depth less that the difference between the width of the cap and the width of the roll tube. In some embodiments, the base section further comprises a bearing groove circumferentially positioned along the outer surface of the cap at or approximately at the junction of the base portion and the pin portion, with a width larger than the bearing such that the at least one bearing mechanism is capable of being at least partially positioned into the bearing groove. In some embodiments, the wall, the ring groove, and the bearing groove, alone or in combination, are capable of preventing wrapping material from contacting the bearing mechanism.

In some embodiments, the system comprises: a pair of oppositely facing sidewalls configured for attachment to a frame or a subframe of a harvester; at least one material spread roll, positioned transversely between the pair of sidewalls and about a rotational axis, the at least one material spread roll comprising: (i) a roll tube comprising an exterior surface, a longitudinal length and at least one face on at least one end of the longitudinal length, said face defining a width of the roll tube; (ii) at least one cap positioned over or proximate to the at least one face of the roll tube, said cap comprising a base portion and a pin portion; and (iii) at least one bearing mechanism comprising a bearing and a flange. In some embodiments, the base portion of the at least one cap comprises oppositely positioned inner and outer surfaces laterally positioned relative to the roll tube and oppositely a contiguous ring surface axially positioned relative to the roll tube. In some embodiments, the pin portion of the at least one cap comprises an outer surface and is longitudinally positioned around the rotational axis. In some embodiments, the inner surface of the base portion of the at least one cap covers, is adjacent to, or is proximate to the at least one face of the roll tube. In some embodiments, the bearing is positioned around the pin portion of the at least one cap and the flange is mechanically linked to at least one sidewall.

Figure 1:
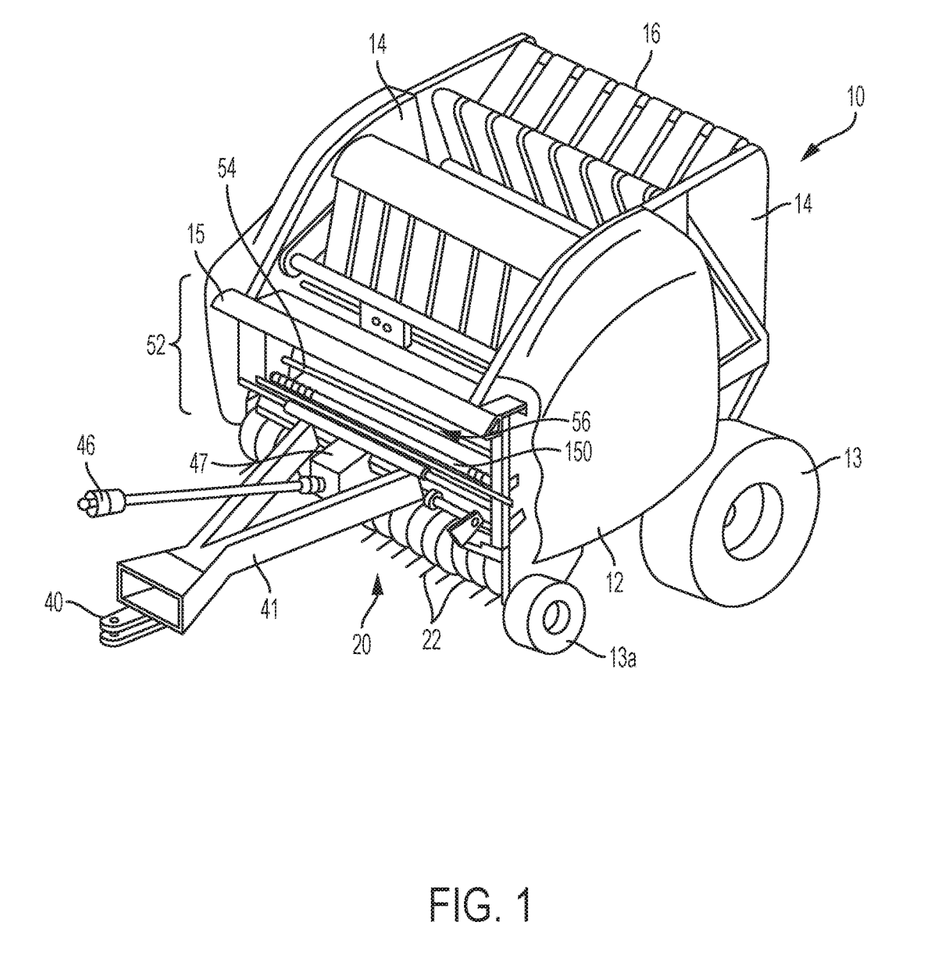
FIG. 1 depicts a representative image of a traditional baler according to an embodiment.

FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would passed around a spreader roll 150 as wrapping material is fed into a feeding entry 56.

Figure 2:
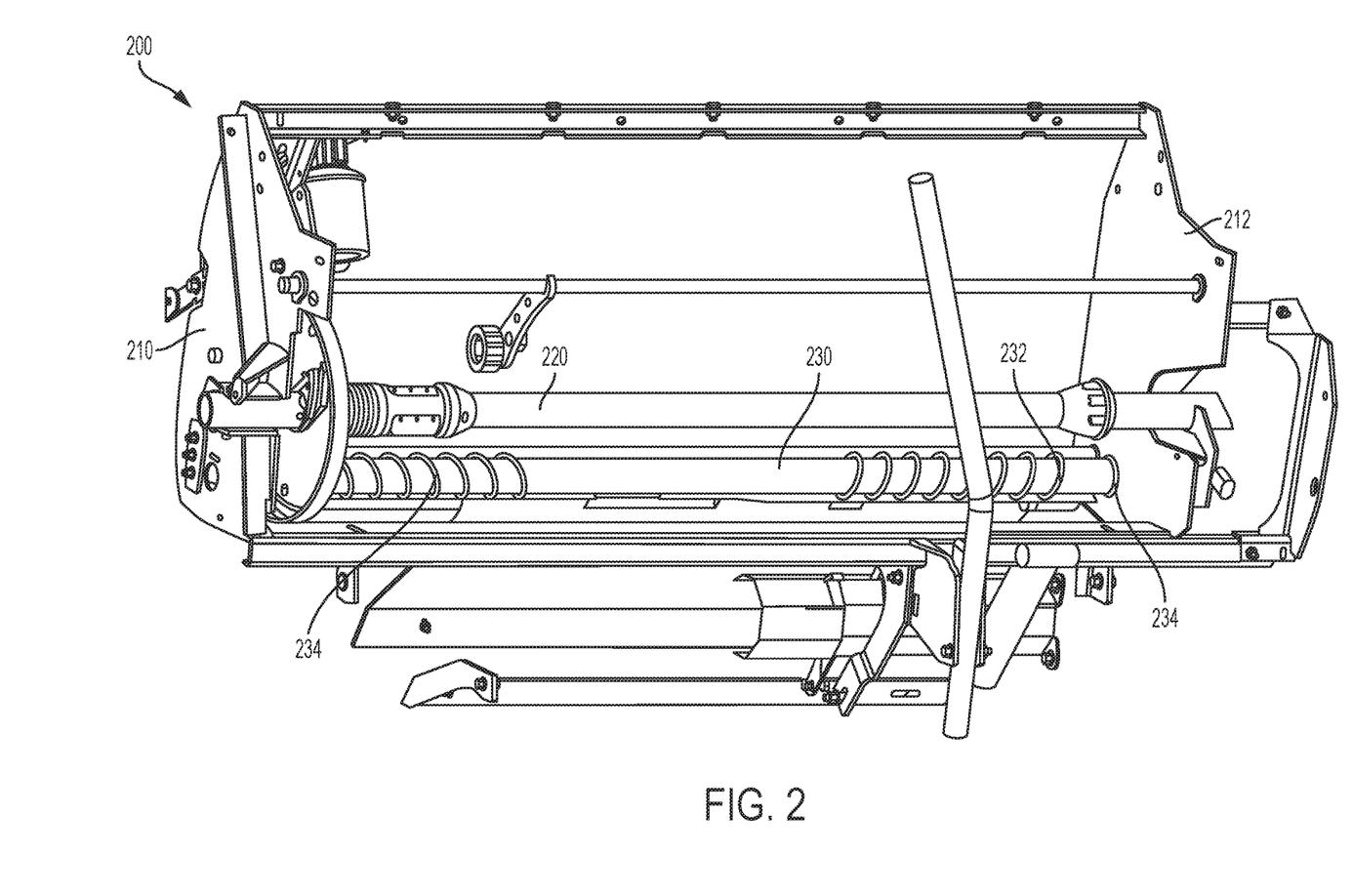
FIG. 2 depicts a traditional wrapping system with a conventional spread roll.

FIG. 2 depicts a front facing view of a traditional wrapping assembly 200, which is defined in part by a pair of oppositely facing sidewalls 210 and 212. Attached to and positioned between the sidewalls 210, 212 is a material support cylinder 220 and a spreader roll 230. The material support cylinder 220 supports a roll of wrapping material (not shown). The traditional spreader roll 230 has two coils 232 and 234 on opposite sides, each forming a screw-like device that spirals towards their respective sidewalls (coil 232 to sidewall 212 and coil 234 to sidewall 210). The spreader roll 230 is connected to the sidewalls 210, 212 by a cap and bearing system, only one of which is shown 234.

Figure 3:
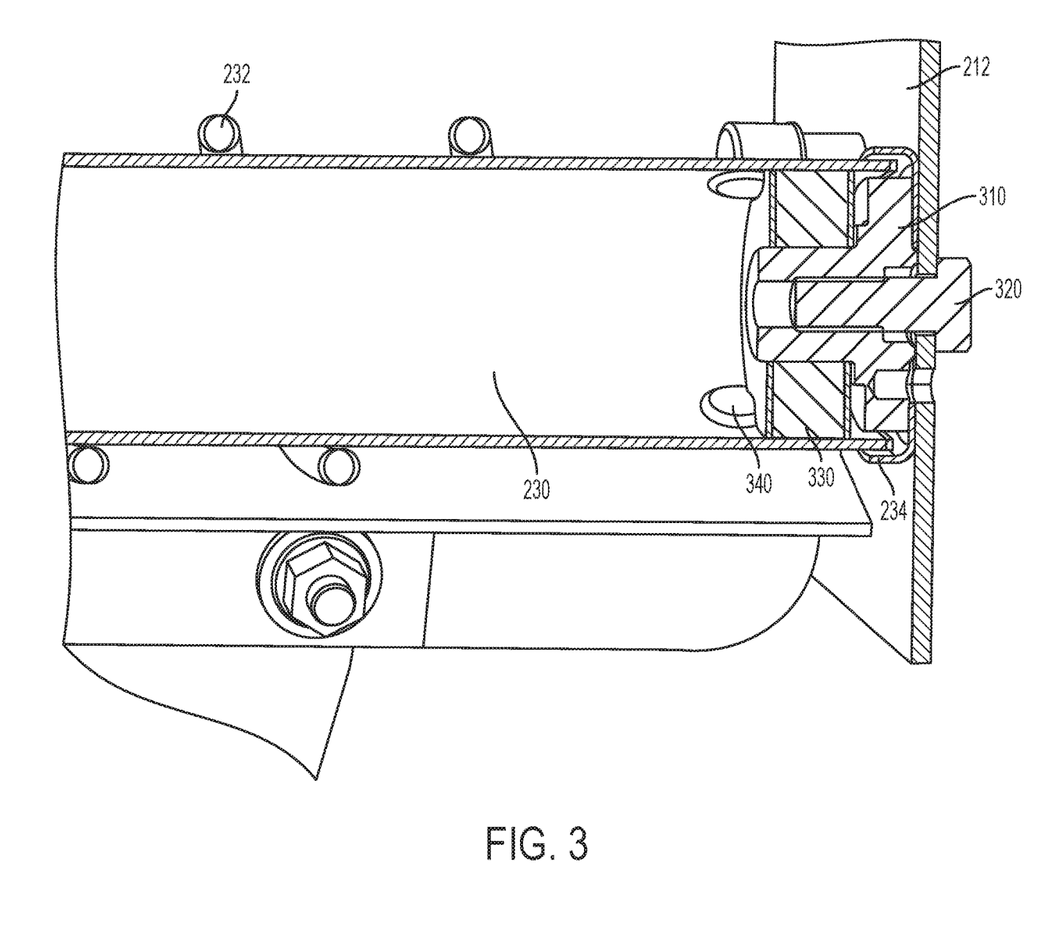
FIG. 3 depicts a cross section diagram of one end of a conventional spread roll.

FIG. 3 depicts a close-up, cross-section view of one of the ends of the spreader roll. The roll tube itself is 230 and is hollow. Wrapping around the roll tube 230 is the coil 232. The cap and bearing system comprises a cap 234, a bracket 310, a bearing 330, and a connecting pin 320. The roll tube 230 is directly attached only to the bearing 330, which in turn is mechanically connected to the bracket 310. The bracket is fastened to the sidewall 212 by the connecting pin 320, which is typically a threaded bolt. Placed in between the bracket 310 and the sidewall 212 is the cap 234, the outer lip of which curves to cover the very end of the roll tube 230. Movement of the bearing 330 is prevented by several raised sections of the interior surface of the roll tube 340. Note that although the bearing 330 is seemingly well protected from foreign debris, there is a small gap between the end of the roll tube 230 and the cap 234. With use, wrapping material spread toward the sidewall 212 by the rotation of the coil 232 can come in contact with the cap 234 and pieces of wrapping material can enter the gap. Wrapping material and other unwanted debris can build up next to and around the bearing 234 and the bracket 310, causing damage to the entire system.

Figure 4:
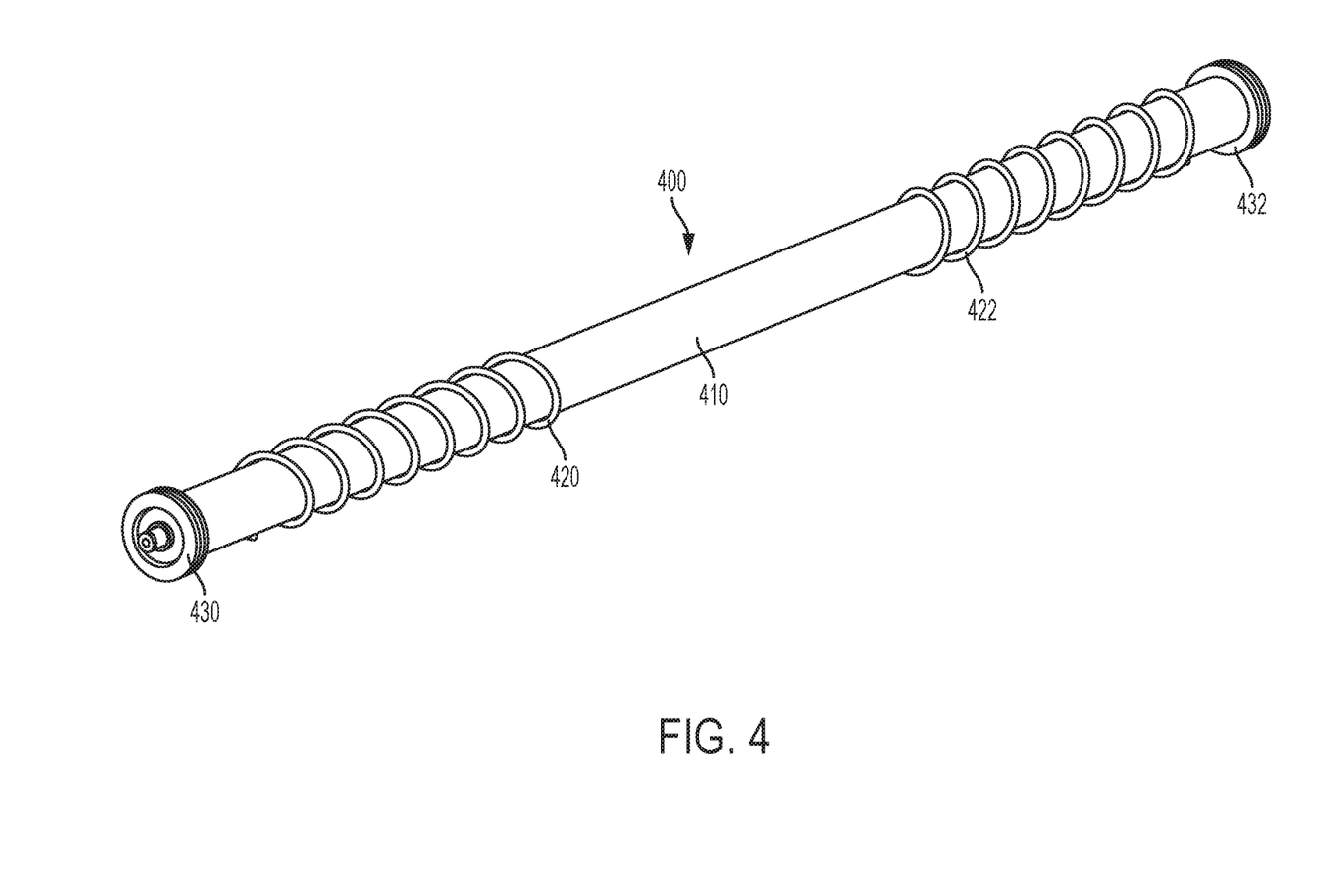
FIG. 4 depicts a three dimensional view of a spread roll with a cap and bearing system that prevents wrapping material from contacting the bearings of said roll.

FIG. 4 depicts an exemplarily spreader roll with an improved cap and bearing system, generally labeled 400. A roll tube 410 has two coils 420 and 422 wrapping around it on either end. Improved caps 430 and 432 cover both ends of the roll tube 410. The parts of this system are more viable is FIG. 5, which depicts a close-up, cross-section view of one of the ends of the spreader roll shown in FIG. 4. The roll tube 410 is hollow, and wrapping around the roll tube 410 is the coil 422. A cap 432 completely covers the end of the roll tube 410. The cap 432 can be generally described with two portions, a base portion, which actually covers the end of the roll tube 410 and has a diameter greater than the diameter of the roll tube 410, and a pin portion, which protrudes out from the base portion around the axis of rotation 502 and is connected to the bearing 540. The base portion has an inner surface 510 which faces the roll tube 410, and outer surface 512 which faces the sidewall 500, and ring surface 514 which connects the inner surface 510 and the outer surface 512 and generally defines the depth of the base portion of the cap 432. The pin portion has an outer surface 560 that is connected to the bearing 540. The bearing 540 is held in place by a two part flange 530 that attaches directly to the sidewall 500 by a series of fasteners and also keeps the bearing 540 covered.

Figure 5:
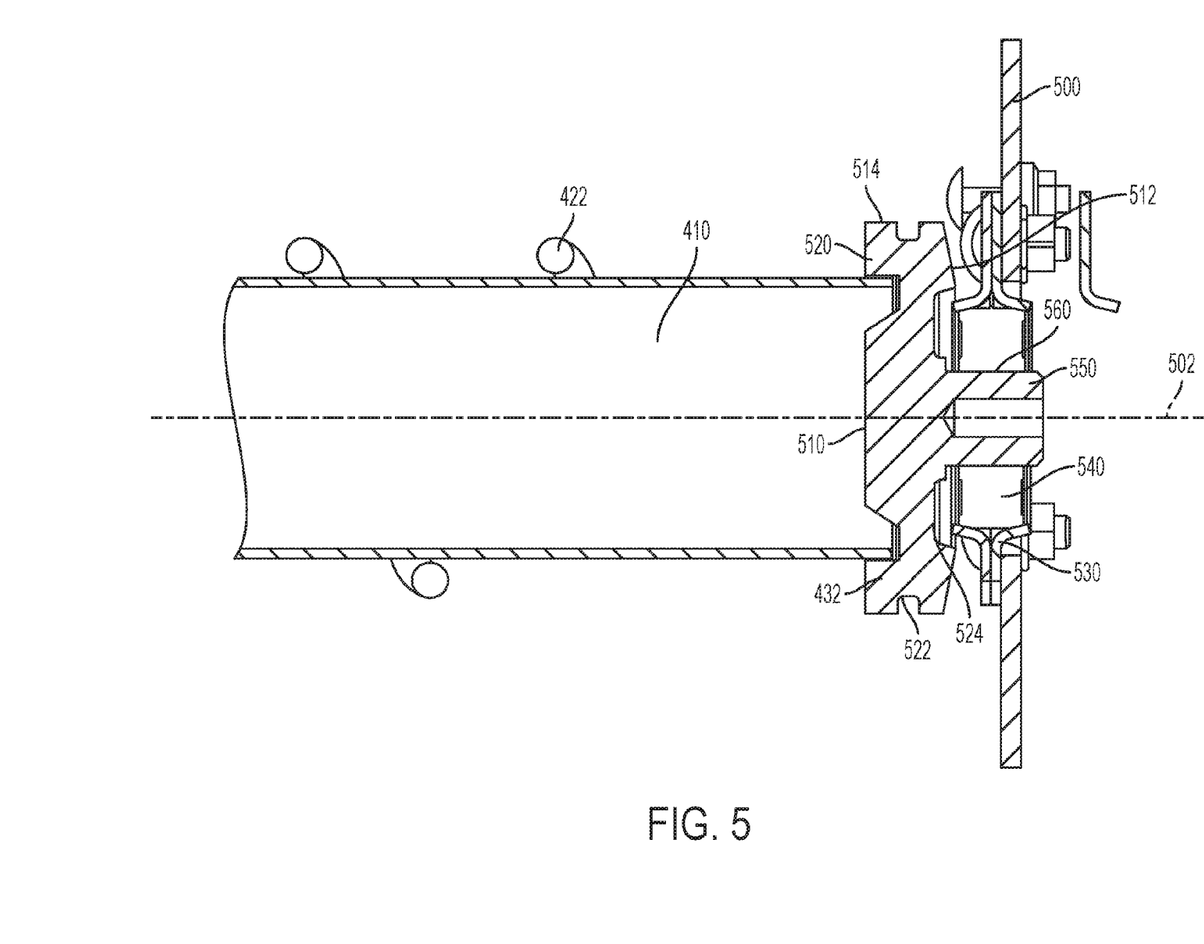
FIG. 5 depicts a cross section diagram of one end of a spread roll with a cap and bearing system that prevents wrapping material from contacting the bearings of said roll.

The portion of the inner surface 510 that is outside the diameter of the roll tube 410 is the wall 520. The wall 520 is circumferentially positioned along the exterior surface of the roll tube 410, with a height equal to or approximately equal to the difference between the width of the cap 430 and the width of the roll tube 410. The wall 520 prevents wrapping material (not shown) from reaching the bearing 540 when the wrapping material is being stretched out across the roll tube 410 by the coil 422 by acting as a barrier that stops the movement of the wrapping material.

Along the ring surface 514 there is a ring groove 522. Like the ring surface 514, the ring groove 522 is circumferentially positioned between the inner surface 510 and the outer surface 512 of the cap 432. The ring groove 522 has a depth less than the difference between the width of the cap 421 and the width of the roll tube 410, and in the depicted embodiment, the depth of the ring groove 522 is about one third the height of the wall 520. The ring groove 522 also prevents wrapping material from reaching the bearing 540 when the wrapping material is being stretched out across the roll tube 410 by the coil 422 by acting as to catch the edge of the wrapping material and prevent it from moving further towards the bearing 540.

The portion of the outer surface 512 that is positioned next to the pin portion of the cap 432 is the bearing groove 524. The bearing groove 524 is circumferentially positioned along the outer surface 512 at or approximately at the junction of the base portion and the pin portion, with a width larger than the bearing 540. In this manner, when the cap 432 is assembled with the bearing 540 and flange 530 in the sidewall 500, the bearing groove 524 forms space that allows the rest of the outer surface to partially cover the entrance to the bearing 540. The bearing groove 524 also prevents wrapping material from reaching the bearing 540 when the wrapping material is being stretched out across the roll tube 410 by the coil 422 by forcing the wrapping material to bend around the outer surface 512 and into the bearing groove 524 to reach the bearing 540.

The wall 520, the ring groove 522, and the bearing groove 524 all work independently to prevent wrapping material from reaching the bearing 540, and, in some embodiments, any one of them individually is capable of preventing the wrapping material from reaching the bearing 540. However, the wall 520, the ring groove 522, and the bearing groove 524 all provide different mechanical mechanisms for preventing the wrapping material from reaching the bearing 540, and are therefore most effective working together as in the depicted embodiments. For example, the wall 520, being closest to the coil 422 and the tube roll 410, is likely to contact the wrapping material first and prevent further movement of the wrapping material toward the bearing 540. However, if the wall 520 fails to stop or completely stop the movement of the wrapping material, for example, because debris buildup at the juncture of the wall 520 and the roll tube 410 allows the wrapping material to slide over the wall, the ring groove 522 and/or the bearing groove 524 continue to be available to stop the movement of the wrapping material.

Figure 6A:
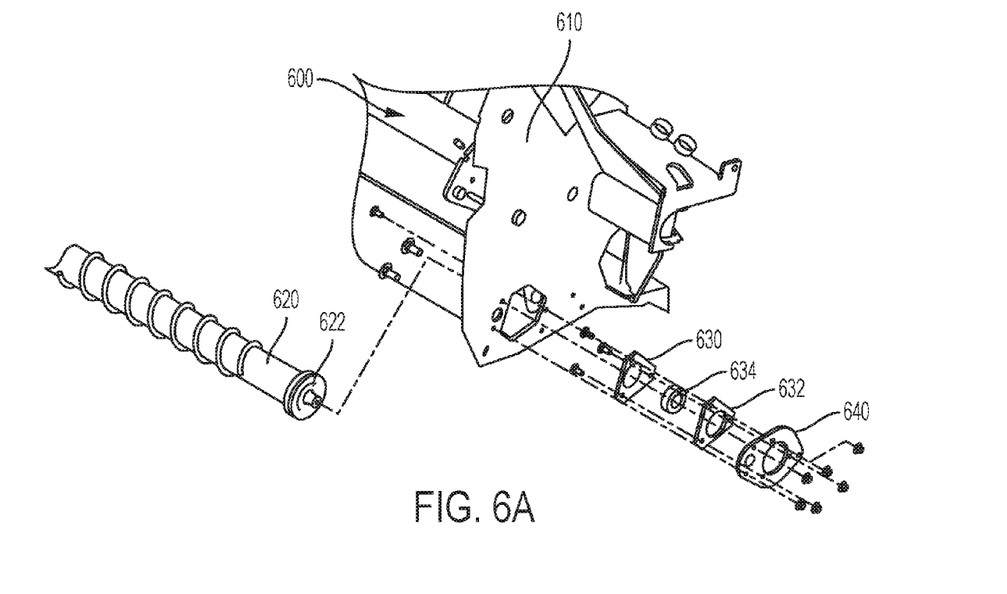
FIG. 6A depicts the roll tube, bearing, flange, and related hardware separately.
Figure 6B:
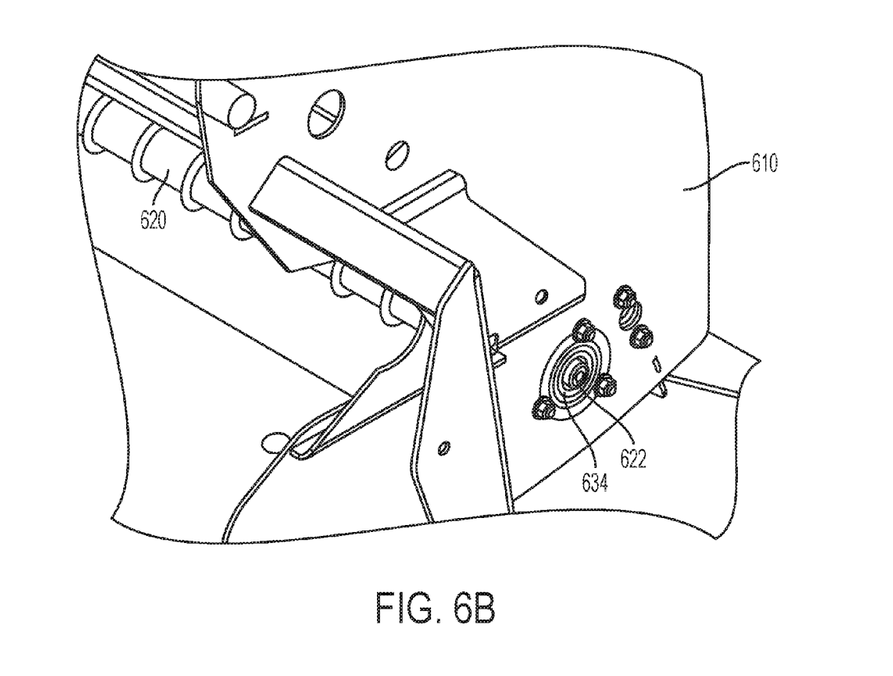
FIG. 6B depicts the roll tube, bearing, flange, and related hardware assembled into the sidewall.

FIGS. 6A and 6B depict the assembly of the spreader roll into a wrapping assembly 600. In FIG. 6A, the roll tube 620 with a cap 622, is to be assembled into the bearing mechanism, shown separated into an inner flange 630, the bearing 634, and an outer flange 620. The bearing mechanism is fastened to a bearing plate 640, which is then fastened to the harvester sidewall 610. In some embodiments, the bearing mechanism is fastened directly to the sidewall 610. In some embodiments, the fasteners are screws, nuts and bolts, and/or rivets. In FIG. 6B, the wrapping assembly is shown fully assembled in the sidewall 610, with the roll tube 620 and cap 622 fitted into the bearing 634.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester comprising:
   a pair of oppositely facing sidewalls configured for attachment to a frame or a subframe of the harvester;

at least one material spread roll, positioned transversely between the pair of sidewalls and about a rotational axis, the at least one material spread roll comprising:
(i) a roll tube comprising an exterior surface, a longitudinal length and at least one face on at least one end of the longitudinal length, said face defining a width of the roll tube;
(ii) at least one cap positioned over or proximate to the at least one face of the roll tube, said cap comprising a base portion and a pin portion; and
(iii) at least one bearing mechanism comprising a bearing and a flange;

wherein the base portion of the at least one cap comprises oppositely positioned inner and outer surfaces laterally positioned relative to the roll tube and oppositely a contiguous ring surface axially positioned relative to the roll tube;

wherein the pin portion of the at least one cap comprises an outer surface and is longitudinally positioned around the rotational axis;

wherein the inner surface of the base portion of the at least one cap covers, is adjacent to, or is proximate to the at least one face of the roll tube; and wherein the bearing is positioned around the pin portion of the at least one cap and the flange is mechanically linked to at least one sidewall of the pair of sidewalls.

2. The harvester of claim 1, wherein the base portion comprises:
a wall on the inner surface of the cap, circumferentially positioned along the exterior surface of the roll tube, with a height equal to or approximately equal to the difference between the width of the cap and the width of the roll tube;
a ring groove circumferentially positioned along the ring surface of the cap; and
a bearing groove circumferentially positioned along the outer surface of the cap at or approximately at the junction of the base portion and the pin portion, with a width larger than the bearing such that the at least one bearing mechanism is capable of being at least partially positioned into the bearing groove;
wherein the wall, the ring groove, and the bearing groove, alone or in combination, are capable of preventing wrapping material from contacting the bearing mechanism.

3. The harvester of claim 1, wherein the base portion comprises a ring groove circumferentially positioned along the ring surface of the cap; and wherein the ring groove is capable of preventing wrapping material from contacting the bearing mechanism.

4. The harvester of claim 1, wherein the base portion comprises a bearing groove circumferentially positioned along the outer surface of the cap at or approximately at the junction of the base portion and the pin portion, with a width larger than the bearing such that the at least one bearing mechanism is capable of being at least partially positioned into the bearing groove; and wherein the bearing groove is capable of preventing wrapping material from contacting the bearing mechanism.

5. The harvester of claim 1, wherein the base portion comprises a wall on the inner surface of the cap, circumferentially positioned along the exterior surface of the roll tube, with a height equal to or approximately equal to the difference between the width of the cap and the width of the roll tube; and wherein the wall is capable of preventing wrapping material from contacting the bearing mechanism.

6. The harvester of claim 1, wherein the material spread roll and the roll tube are cylindrical.

7. The harvester of claim 1, wherein a coil is positioned around the outside surface of the longitudinal length of the roll tube.

8. The harvester of claim 1, wherein there is a groove or cavity in the ring surface of the base portion.

9. The harvester of claim 1, wherein the outer surface of the pin portion and the outer surface of the base portion are contiguous.

10. The harvester of claim 1, wherein the outer surface of the pin portion is orthogonal to the outer surface of the base portion.

11. The harvester of claim 1, wherein the at least one material spread roll comprises two caps, with each of the inner surfaces of the two caps covering the ends of the roll tube.

12. The harvester of claim 1, wherein the system further comprises a wrapping material positioned around the material spread roll.

13. The harvester of claim 12, wherein, in a first operation mode, at least one coil spreads the wrapping material across the longitudinal length of the roll tube as a cylinder rotates about the rotational axis.

14. The harvester of claim 13, wherein, in the first operational mode, the at least one cap is capable of preventing the wrapping material from contacting the bearing mechanism and from contacting the pin portion of the at least one cap.

15. A harvester comprising:
a pair of oppositely facing sidewalls attached to a frame or a subframe of the harvester;
at least one material spread roll, positioned transversely between the pair of sidewalls and about a rotational axis, the at least one material spread roll comprising:
(i) a roll tube comprising an exterior surface, a longitudinal length and at least one face on at least one end of the longitudinal length, said face defining a width of the roll tube;
(ii) at least one cap positioned over or proximate to the at least one face of the roll tube, said at least one cap comprising a base portion and a pin portion; and
(iii) at least one bearing mechanism comprising a bearing and a flange;

wherein the base portion of the at least one cap comprises oppositely positioned inner and outer surfaces laterally positioned relative to the roll tube and oppositely a contiguous ring surface axially positioned relative to the roll tube;

wherein the pin portion of the at least one cap comprises an outer surface and is longitudinally positioned around the rotational axis;

wherein the inner surface of the base portion of the at least one cap covers, is adjacent to, or is proximate to the at least one face of the roll tube; and wherein the bearing is positioned around the pin portion of the at least one cap and the flange is mechanically linked to at least one sidewall of the pair of sidewalls.

16. The harvester of claim 15, wherein the base portion comprises a wall on the inner surface of the cap, circumferentially positioned along the exterior surface of the roll tube, with a height equal to or approximately equal to the difference between the width of the cap and the width of the roll tube; and wherein the wall is capable of preventing wrapping material from contacting the bearing mechanism.

17. The harvester of claim 15, wherein the base portion comprises a ring groove circumferentially positioned along the ring surface of the cap; and wherein the ring groove is capable of preventing wrapping material from contacting the bearing mechanism.

18. The harvester of claim 15, wherein the base portion comprises a bearing groove circumferentially positioned along the outer surface of the cap at or approximately at the junction of the base portion and the pin portion, with a width larger than the bearing such that the at least one bearing mechanism is capable of being at least partially positioned into the bearing groove; and wherein the bearing groove is capable of preventing wrapping material from contacting the bearing mechanism.

19. The harvester of claim 15, wherein the base portion comprises:
  a wall on the inner surface of the cap, circumferentially positioned along the exterior surface of the roll tube, with a height equal to or approximately equal to the difference between the width of the cap and the width of the roll tube;
  a ring groove circumferentially positioned along the ring surface of the cap; and
  a bearing groove circumferentially positioned along the outer surface of the cap at or approximately at the junction of the base portion and the pin portion, with a width larger than the bearing such that the at least one bearing mechanism is capable of being at least partially positioned into the bearing groove;
  wherein the wall, the ring groove, and the bearing groove, alone or in combination, are capable of preventing wrapping material from contacting the bearing mechanism.

20. A method of wrapping a bale, comprising:
  (a) loading a roll of wrapping material onto a material support cylinder;
  (b) dispensing wrapping material from the roll of wrapping material onto a material spread cylinder, the material spread cylinder comprising a roll tube;
  (c) spreading the wrapping material across the length of the material spread cylinder by the rotation of the material spread cylinder around an axis, such that the wrapping material is capable of completely covering the width of the bale;
  (d) simultaneous with (c), preventing the wrapping material from reaching at least one bearing positioned at the ends of the material spread cylinder by at least one cap positioned at the ends of the material spread cylinder;
  (e) dispensing the spread wrapping material from the material spread cylinder to the bale in a bale chamber, such that the spread wrapping material is capable of wrapping the bale.

21. The method of claim 20, wherein step (d), the wrapping material is prevented from reaching the at least one bearing by a base portion of the at least one cap, the base portion comprising:
  a wall on an inner surface of the cap, circumferentially positioned along an exterior surface of the roll tube, with a height equal to or approximately equal to a difference between a width of the cap and a width of the roll tube;
  a ring groove circumferentially positioned along a ring surface of the cap; and
  a bearing groove circumferentially positioned along an outer surface of the cap at or approximately at the junction of the base portion and a pin portion, with a width larger than the at least one bearing such that the at least one bearing is capable of being at least partially positioned into the bearing groove;
  wherein the wall, the ring groove, and the bearing groove, alone or in combination, are capable of preventing wrapping material from contacting the at least one bearing.

* * * * *